(12) United States Patent
Ozasa

(10) Patent No.: US 8,774,876 B2
(45) Date of Patent: Jul. 8, 2014

(54) MOBILE ELECTRONIC DEVICE

(75) Inventor: Kenichi Ozasa, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 353 days.

(21) Appl. No.: 13/178,935

(22) Filed: Jul. 8, 2011

(65) Prior Publication Data
US 2012/0028679 A1 Feb. 2, 2012

(30) Foreign Application Priority Data

Jul. 28, 2010 (JP) ................................. 2010-169883

(51) Int. Cl.
*H04M 1/02* (2006.01)
(52) U.S. Cl.
USPC ...................................... 455/575.1; 345/156
(58) Field of Classification Search
USPC ....................................................... 455/575.1
See application file for complete search history.

(56) References Cited

U.S. PATENT DOCUMENTS

| | | | |
|---|---|---|---|
| 7,292,227 B2* | 11/2007 | Fukumoto et al. ............. | 345/173 |
| 7,999,660 B2* | 8/2011 | Cybart et al. ............... | 340/407.2 |
| 2005/0237439 A1* | 10/2005 | Mai ................................ | 349/12 |
| 2008/0122315 A1* | 5/2008 | Maruyama et al. ........... | 310/314 |
| 2009/0294186 A1* | 12/2009 | Fontanella et al. ......... | 178/18.06 |
| 2010/0026662 A1* | 2/2010 | Oohira ........................... | 345/174 |
| 2010/0045612 A1* | 2/2010 | Molne ........................... | 345/173 |
| 2010/0188354 A1* | 7/2010 | Tamura ......................... | 345/173 |
| 2010/0302132 A1* | 12/2010 | Ito et al. ......................... | 345/87 |
| 2010/0328053 A1* | 12/2010 | Yeh et al. .................... | 340/407.2 |
| 2011/0050596 A1* | 3/2011 | Park et al. .................... | 345/173 |
| 2011/0050598 A1* | 3/2011 | Park et al. .................... | 345/173 |
| 2011/0228191 A1* | 9/2011 | Hsu et al. ......................... | 349/58 |

FOREIGN PATENT DOCUMENTS

JP 2000-137576 10/1998

* cited by examiner

*Primary Examiner* — Marcos Batista
*Assistant Examiner* — Frank Donado

(57) ABSTRACT

A mobile electronic device includes: a housing that includes an opening part; a display part that includes a display area and that is disposed inside the housing, wherein the display area is visible from the outer section of the housing through the opening part; a touch panel that is stacked and disposed on the outer side of the housing facing the display area of the display part, and that is exposed to the outer section of the housing; and a vibration part that is disposed in the touch panel in the area that is on the outer circumferential side of the display part in the planar direction of the touch panel.

13 Claims, 8 Drawing Sheets

MOBILE ELECTRONIC DEVICE

CROSS-REFERENCE TO RELATED APPLICATION

The present application claims priority under 35 U.S.C. §119 to Japanese Patent Application No. 2010-169883, filed on Jul. 28, 2010, entitled "MOBILE ELECTRONIC DEVICE". The content of which is incorporated by reference herein in its entirety.

FIELD

Embodiments of the present disclosure relate generally to a mobile electronic device.

BACKGROUND

Currently, mobile electronic devices such as mobile phones, comprising a touch panel and a vibration part, are known. These mobile electronic devices output feedback to the user with respect to the operation by causing the vibration part to vibrate when the touch panel is operated by the user.

However, the touch panel and the display part are stacked and disposed in the inner section of the housing of these mobile electronic devices, in the direction of the thickness of the display part. The vibration part is disposed corresponding to the display part. Therefore, in a case in which a shock is applied externally to the housing, because the shock is transmitted to the display part through the vibration part, there are concerns regarding malfunctions occurring to the display part.

SUMMARY

A mobile electronic device includes a housing, a display part, a touch panel, and a vibration part. The housing includes an opening part. The display part is disposed inside the housing and comprises a display area. The display area is visible from the outer section of the housing through the opening part. The touch panel is stacked and disposed on the outer side of the housing facing the display area of the display part, and that is exposed to the outer section of the housing. The vibration part is disposed in the touch panel in the area that is on the outer circumferential side of the display part in the planar direction of the touch panel.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure are described herein in the context of one practical non-limiting application, namely, an information device. Embodiments of the disclosure, however, are not limited to such mobile information devices, and the techniques described herein may also be utilized in other applications. For example, embodiments may be applicable to mobile phones, digital books, digital cameras, electronic game machines, digital music players, personal digital assistance (PDA), personal handy phone system (PHS), lap top computers, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

A mobile phone, which is one example of a mobile electronic device according to the present invention, is explained in detail with reference to the figures. However, the present invention is not limited to the following explanation. The components described below, include components easily presumed by persons skilled in the art, and practically the same components, in other words, components that fall under an equal range. In the following embodiments, as the mobile electronic device according to the present invention, the mobile phone is mentioned; however, the application scope of the present invention is not limited to mobile phones. The present invention can also be applied to, for example, PHSs (Personal Handy-phone Systems), PDAs, portable navigation devices, laptops, and game machines.

Figure 1:
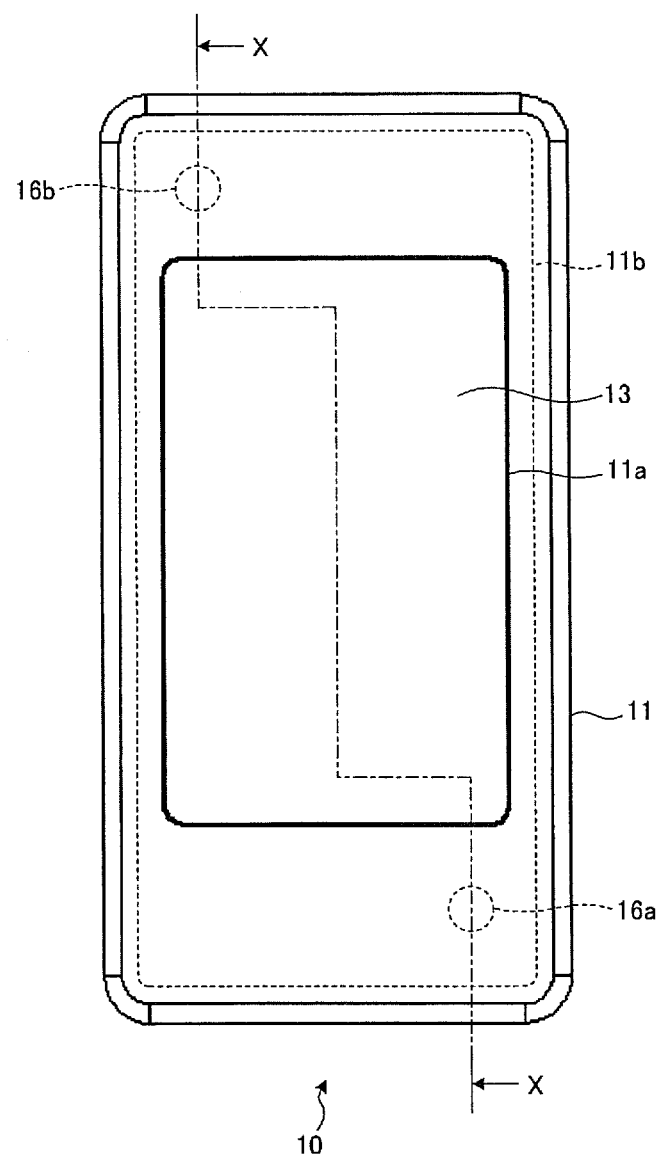
FIG. 1 is a front view of a mobile electronic device.
Figure 2:
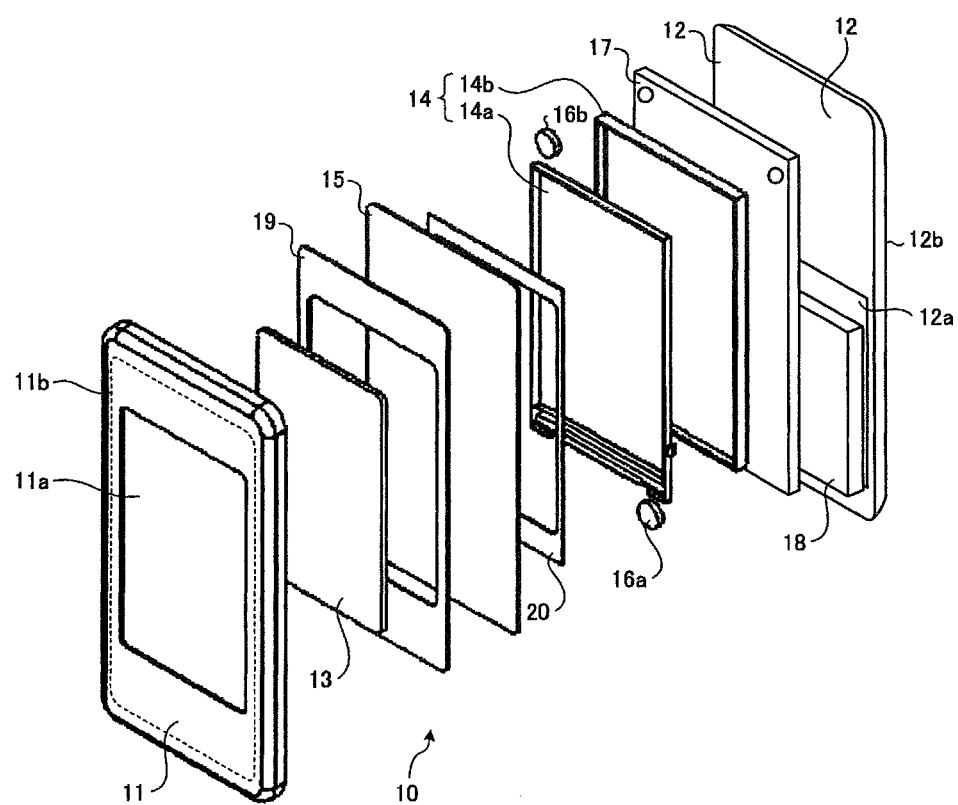
FIG. 2 is an exploded perspective view of the mobile electronic device.

FIG. 1 is a front view of a mobile phone 10. FIG. 2 is an exploded perspective view of the mobile phone 10. The mobile phone 10 comprises a front case 11 (housing) and a rear case 12 (housing) on the outer side. A housing part is formed by the front case 11 and the rear case 12.

The front case 11 is formed, for example, from resins. The front case 11 comprises an approximately rectangular flat plate part 11*b*. The front case 11 comprises four side plate parts that are disposed perpendicular to the flat plate part 11*b* on four sides of the flat plate part 11b, respectively. To the front case 11, an opening part 11a is formed approximately in the center of the flat plate part 11b.

The rear case 12 is formed from resins. The rear case 12, as with the front case 11, comprises an approximately rectangular flat plate part 12b. The rear case 12, as with the front case 11 comprises four side plate parts that are disposed perpendicular to the flat plate part 12b on four sides of the flat plate part 12b, respectively,. In the rear case 12, an opening part for battery storage is formed in one section of the flat plate part 12b. A battery cover 12a is fitted to the opening part for battery storage.

The outer surface of the mobile phone 10 is formed from the front case 11, the rear case 12, the battery cover 12a, and a window 13.

The window 13 is a transparent plate that is formed from, for example, glass or resins. The window 13 is disposed inside the opening part 11a of the front case 11. The surface of the outer side of the window 13 constitutes the same flat surface as the outer surface of the flat plate part 11b.

Figure 3:
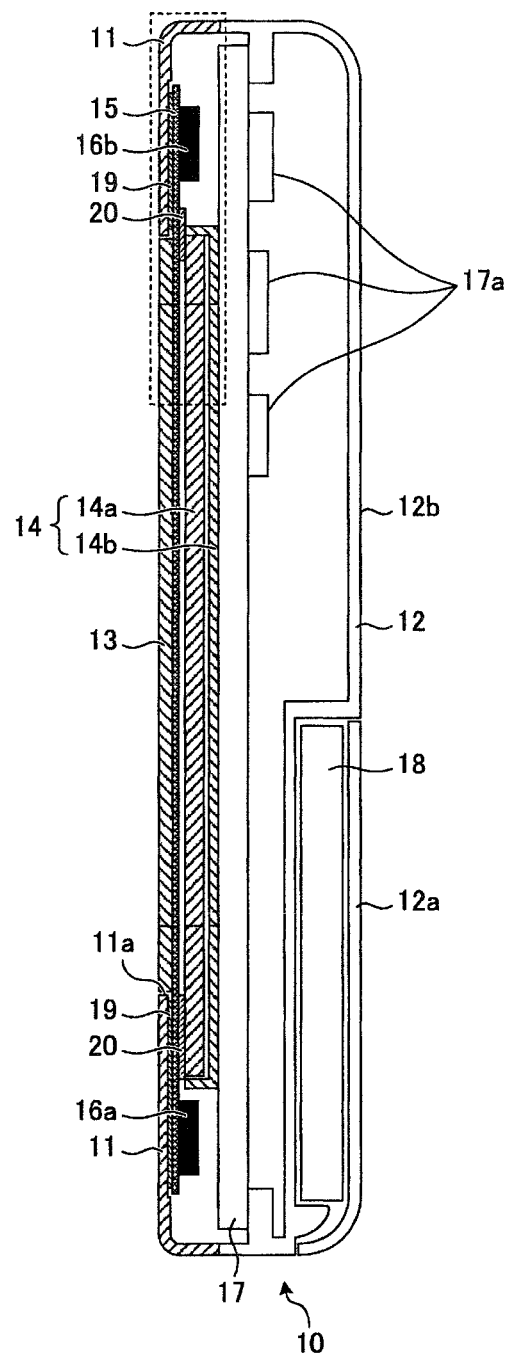
FIG. 3 is a sectional view of the mobile electronic device in the X-X direction, shown in FIG. 1.
Figure 4:
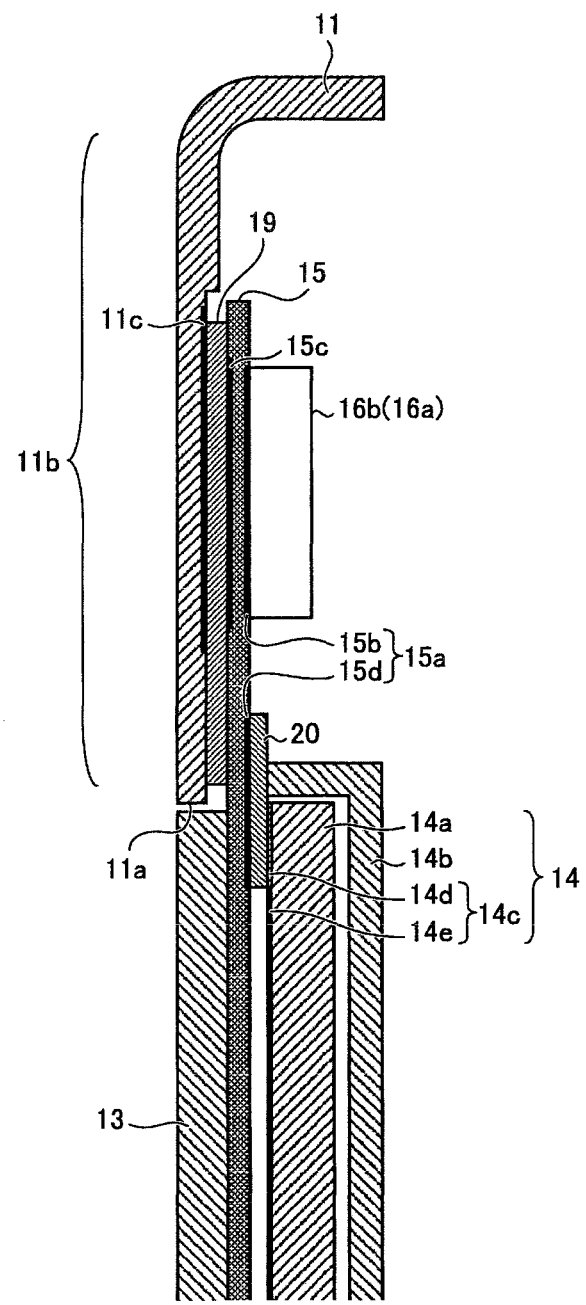
FIG. 4 is a diagram in which the section surrounded by the dotted line in FIG. 3 is enlarged.

FIG. 3 is a sectional view of the mobile phone 10 in the X-X direction, shown in FIG. 1. FIG. 4 is a diagram in which the section surrounded by the dotted line in FIG. 3 is enlarged. Below, using FIG. 2, FIG. 3, and FIG. 4, the positional relationship of each part constituting the mobile phone 10 is explained.

On the inner section of the mobile phone 10, from the window 13 side along the thickness direction to the inner side of the housing part (in FIG. 1, in the direction approaching the rear side from the paper surface, hereinafter referred to as the "stacking direction"), a first elastic member 19, a touch panel 15, a second elastic member 20, a display part 14, a circuit board 17, a battery 18, and the rear case 12 are disposed on the inner section of the housing part in this sequence. Next, each part is described in more detail.

The touch panel 15 is one type of operation input part that detects external operations to the operation surface on the outer side of the housing. Specifically, the touch panel 15 comprises an operation surface that has an approximately flat plate shape (contact surface) which has a certain area. The touch panel 15, when an external substance comes in contact with sections of the contact surface, transmits predefined electrical signals to the control part of the mobile phone 10, according to the location at which contact was made by the external substance.

In the present embodiment, the touch panel 15 is a capacitance type touch panel and comprises a transparent conducting layer. The touch panel 15, in a case in which it is brought into contact with an external substance such as a human finger, detects changes in the capacitance between the conducting layer and the external substance. The touch panel 15, based on changes in the capacitance that is detected, detects the location at which contact between the surface and the external substance is made, and transmits predefined electrical signals showing the location at which contact was made with the external substance, to the control part.

In a case in which the touch panel uses the capacitance method, it is not necessary for the contact surface to be brought into direct contact with the external substance. Therefore, as is the case with the present embodiment, the touch panel 15 detects contact with the external substance, even if the window 13 is placed between the contact surface and the external substance.

Because the touch panel 15 is stacked and disposed on the outer side of the housing part, facing a display area 14e side of the display part 14, the touch panel 15 is exposed from the housing part.

The touch panel 15 is directly fixed to the window 13. The first elastic member 19 is disposed between the touch panel 15 and the front case 11. The first elastic member 19 is subsequently described in detail. A vibration part 16 is disposed on the touch panel 15.

The display part 14 is disposed on the inner side of the housing of the touch panel 15.

The vibration part 16 is a component that generates vibration. In the present embodiment, the vibration part 16 is a vibration member 16a and a vibration member 16b, which are coin shaped coin motors. The vibration part 16 vibrates when the touch panel 15 detects a touch by an external substance such as the finger of the user, that is, the vibration part 16 notifies the user that the user has performed an input.

The vibration member 16a is disposed on the edge of the mobile phone 10 in the longitudinal direction. The vibration member 16b is disposed on the edge section on the opposite side from the edge section on which the vibration member 16a is disposed. Specifically, the vibration member 16a is disposed side by side with the display part 14 on the inner section of the housing part, and furthermore, the vibration member 16a is disposed on the surface facing the inner side of the flat plate part 11b. The vibration member 16b is disposed in the diagonal direction of the display part 14, with respect to the vibration member 16a, and is disposed on the surface facing the inner side of the flat plate part 11b. The mounting configuration of the vibration part 16 is subsequently described in detail with respect to the touch panel 15.

The display part 14 displays information to the outer section of the housing part through the window 13 and the touch panel 15. The display part 14 comprises a display device 14a and a metal frame 14b. The display part 14 has a flat plate shape.

The display device 14a is an LCD (Liquid Crystal Display) or organic electro-luminescence (Organic Electro-Luminescence), and comprises a display surface 14c that displays a variety of information.

Parts other than the display surface 14c of the display device 14a are surrounded by the metal frame 14b. Because the metal frame 14b surrounds the parts other than the display surface 14c of the display device 14a, the metal frame 14b retains the display device 14a, and at the same time, functions to protect the device from external shock.

The display part 14 comprises a non-display area 14d and a display area 14e in the display surface 14c. The non-display area 14d is the area that is located at the outer circumferential section of the display surface 14c. The display area 14e is the area other than the display area 14e that is adjacent to the non-display area 14d, among the areas that the display surface 14c includes. The display part 14 is disposed on the inner section of the housing part, such that the display area 14e is visible from the outer section of the housing part through the opening part 11a.

The second elastic member 20 is disposed between the display part 14 and the touch panel 15. The second elastic member 20 is, as with the first elastic member 19, a component comprising elasticity such as a sponge and has a large elastic modulus, compared to the first elastic member 19.

The alignment of the second elastic member 20, the touch panel 15, and the display part 14 is subsequently described in detail.

The circuit board 17 is a component having an approximately flat plate shape and comprises various semiconductor chips 17a, such as control parts, on the surface. The circuit board 17 is disposed between the display part 14 and the battery 18, in the stacking direction in the inner section of the housing part. Screw holes are formed in the four corners of the circuit board 17. Screws or pins inserted into the screw holes fix the circuit board 17 to the rear case 12. Specifically, the circuit board 17 is fixed to the rib which is formed at the rear case 12 using screws or pins.

The battery 18 is a component that supplies electric power to each component, such as the control parts, the touch panel 15, and the vibration part 16. The battery 18 is disposed between the battery cover 12a and the circuit board 17 in the inner section of the housing part. The battery cover 12a is disposed on the outer side of the housing part so as to cover the opening part that is formed in the rear case 12. The battery cover 12a is detachable by the user. When the battery cover 12a is removed from the rear case 12, the battery 18 is disposed at a position that is externally exposed. Therefore, the battery 18 is detachable by the user, when the battery cover 12a is removed.

Next, the mounting configuration of the vibration part 16 in the present embodiment is described in detail with reference to FIG. 4.

The vibration part 16 (the vibration member 16a or the vibration member 16b) is disposed to a first surface 15a (the surface facing the display surface 14c) towards the inner side of the stacking direction of the housing part of the touch panel 15. In other words, the vibration part 16 is disposed side by side with the display part 14 in the planar direction of the first surface 15a on the first surface 15a. That is, the vibration part 16 is disposed in the area that is on the outer circumferential side of the touch panel 15. The vibration part 16 is fixed to a first area 15b, which is the area overlapping the flat plate part 11b among the areas that the first surface 15a comprises. In other words, the vibration part 16 is fixed to the first area 15b, which is the area on the outer circumferential side of the first surface 15a. This type of configuration reduces any concerns regarding the vibration part 16 being exposed to the outer side of the housing part through the opening part 11a. Because the thickness of the display part 14 in the stacking direction is thinner than the thickness of the vibration part 16 in the stacking direction, the distance between the vibration part 16 and the inner surface of the flat plate part 12b increases compared to the distance between the display part 14 and the inner surface of the flat plate part 12b.

The abovementioned first elastic member 19 is disposed at a position sandwiched between a second area 15c of the touch panel 15 and a second surface 11c of the flat plate part 11b. The first elastic member 19 comprises an adhesive agent or double-sided tape on the surface at which it comes in contact with the second area 15c and on the surface at which it comes in contact with the second surface 11c. The touch panel 15 is fixed to the flat plate part 11b through the first elastic member 19 using the adhesive agent or the double-sided tape that the first elastic member 19 comprises.

The second elastic member 20 is fixed to the non-display area 14d of the display part 14. The second elastic member 20 is disposed on the inner section of the housing because it is sandwiched between a third area 15d that first surface 15a of the touch panel 15 comprises and the abovementioned non-display area 14d. The second elastic member 20 comprises the adhesive agent or the double-sided tape on the surface at which it comes in contact with the third area 15d and on the surface at which it comes in contact with the non-display area 14d. That is, the display part 14 is fixed to the touch panel 15 through the second elastic member 20, using the adhesive agent or the double-sided tape that the second elastic member 20 comprises.

According to the mobile phone 10 comprising the above configuration, because the vibration part 16 is disposed at the first area 15b of the touch panel 15, shocks from the outer section of the housing are transmitted through the vibration part 16 to the display part 14; thereby, inhibiting concerns regarding malfunctions in the display part 14.

Specifically, the mobile phone 10 in the present embodiment, in a case in which shocks are applied from the rear case 12 side, can appropriately inhibit the transmission to the display part 14.

The vibration part 16 is disposed to the first surface 15a of the touch panel 15. The display part 14 and the vibration part 16 are disposed parallel to each other on the inner section of the housing part in the planar direction. Therefore, because the display part 14 and the vibration part 16 do not overlap in the stacking direction, as compared to conventional mobile phones, it is possible to make the mobile phone 10 thinner.

Furthermore, the thickness of the vibration part 16 is thinner than the thickness of the display part 14, in the stacking direction of the display part 14 and the touch panel 15. Therefore, it is possible to make the mobile phone 10 thinner than conventional mobile phones.

The vibration part 16 is disposed at the position at which it overlaps with the flat plate part 11b (the second surface 11c), which is the surrounding area of the opening part 11a of the housing part, in the stacking direction of the display part 14 and the touch panel 15. Therefore, because the vibration part 16 is not exposed to the outer section of the housing through the opening part 11a, the external appearance of the mobile phone 10 is not ruined.

The first elastic member 19 is disposed between the touch panel 15 and the second surface 11c. Furthermore, the touch panel 15 and the window 13 are directly fixed.

The touch panel 15 also comprises the vibration part 16 in the first area 15b, which is the area on the opposite side from the area at which the first elastic member 19 is disposed. That is, the vibration part 16 is disposed so as to overlap with a first elastic member 19 in the stacking direction.

The first elastic member 19 may be a member having waterproof properties, dust resistance, or both properties. This type of member includes, for example, silicon, polypropylene, or Teflon fluoropolymers.

Therefore, before vibrations generated by the vibration part 16 reach the front case 11, some of the vibrations are absorbed by the first elastic member 19. As a result, the vibration part 16 vibrates the touch panel 15 or the window 13 by a larger degree than it vibrates the front case 11, at least.

Therefore, the mobile phone 10 can effectively vibrate the window 13 with which the external substance such as the finger of the user comes in contact. As a result, the mobile phone 10 can appropriately provide feedback to the user with respect to the operation.

Due to the first elastic member 19, it is less likely for external shocks to be transmitted to components disposed on the inner section of the mobile phone 10, making it less likely for malfunctions to be caused.

Because the first elastic member 19 is disposed between the front case 11 and the touch panel 15, external dust, etc., are inhibited from entering the inner section of the housing part from the gap between the front case 11 and the touch panel 15.

The second elastic member 20 is disposed between the touch panel 15 and the display part 14. Therefore, due to the second elastic member 20, it is less likely for external shocks from the outer section of the housing part to be transmitted to the display part 14, making it less likely for malfunctions to be caused as a result of shocks.

As described above, vibrations generated by the vibration part 16 are effectively transmitted to the touch panel 15, compared to the front case 11.

Specifically, vibrations generated by the vibration part 16 are transmitted to the touch panel 15. The touch panel 15 comes in contact with the front case 11 through the first elastic member 19, and comes in contact with the display part 14 through the second elastic member 20. The touch panel 15 and the window 13 are in direct contact with each other.

As described above, the elastic modulus of the first elastic member 19 is smaller than the elastic modulus of the second elastic member 20. That is, the first elastic member 19 absorbs more vibrations than the second elastic member 20.

Therefore, in a case in which the vibration part 16 generates vibrations, the component that vibrates most is the touch panel 15 to which the vibration part 16 is directly fixed.

The window 13 that is in direct contact with the touch panel 15 vibrates with the same degree as the touch panel 15.

The display part 14 that is in contact with the touch panel 15 through the second elastic member 20 and the second elastic member 20 vibrates with a lesser degree than the window 13 because the second elastic member 20 absorbs the vibrations.

Furthermore, the front case 11 that is in contact with the touch panel 15 through the first elastic member 19 vibrates with a lesser degree than the display part 14 because the first elastic member 19 absorbs more vibrations than the second elastic member 20.

That is, in a case in which the vibration part 16 vibrates, the degree of the vibrations decreases in the sequence of: the touch panel 15, the window 13, the display part 14, and the front case 11.

Therefore, the vibration part 16 can transmit more vibrations to the display part 14 than to the front case 11.

Because the vibration part 16 is directly disposed to the touch panel 15, the mobile phone 10 can vibrate the touch panel 15 and the window 13 with lesser amount of energy compared to the prior art.

The second elastic member 20, even in a case in which external force is applied externally to the touch panel 15, has the elastic modulus by the degree in which the distance between the touch panel 15 and the display part 14 is kept approximately constant. Therefore, changes in the capacitance threshold, resulting from changes in the distance between the touch panel 15 and the display part 14, decrease; thereby, reducing incorrect operations of the touch panel 15.

MODIFIED EXAMPLE

The vibration part 16 disposed in the mobile phone 10 is an electronic component. Therefore, it is necessary for the vibration part 16 to be connected to the supply conducting wire of the electric power and the grounding conductor.

Figure 5:
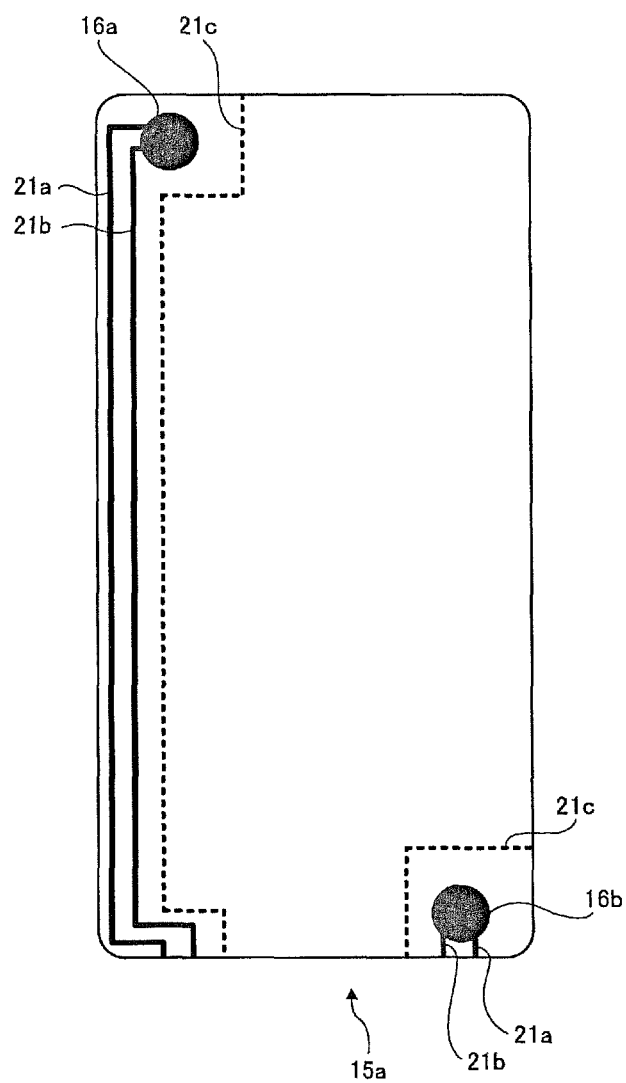
FIG. 5 is a diagram showing a first surface comprising a supply conducting wire and a grounding conductor.

FIG. 5 is a diagram showing the first surface 15a of the touch panel 15, at which the supply conducting wire and the grounding conductor are disposed.

The vibration part 16, as shown in FIG. 5, may be connected to a supply conducting wire 21a and a grounding conductor 21b disposed on the surface of the first surface 15a of the touch panel 15. The supply conducting wire 21a is electrically connected to the positive electrode of the battery 18, by being connected through other conducting wires, etc. The grounding conductor 21b is also electrically connected to the negative electrode of the battery 18, by being connected through other conducting wires, etc.

The first surface 15a comprises a ground pattern 21c. The ground pattern 21c is disposed on the first surface 15a so as to divide the central area of the first surface 15a (operating area) and the area on which the vibration part 16, the supply conducting wire 21a, and the grounding conductor 21b are disposed (non-operating area).

The non-operating area is formed above the first surface 15a so as to overlap with the flat plate part 11b in the stacking direction.

In this way, as the operating area and the non-operating area in the first surface 15a of the touch panel 15 are divided by the ground pattern 21c, the effect of the electromagnetic wave noise emitted from the vibration part 16 and the supply conducting wire 21a to the operating area of the touch panel 15 can be reduced.

Because the non-operating area is formed on the first surface 15a, so as to overlap with the flat plate part 11b in the stacking direction, it is possible to form the operating area on the first surface 15a in a broad manner. Furthermore, the touch panel 15 supplies the electric power and takes measures against noise in the area in which it is not exposed from the opening part 11a; thus, effectively using the space of the first surface 15a.

Because the electrical potential of the grounding conductor 21b and the electrical potential of the ground pattern 21c are equivalent, the grounding conductor 21b and the ground pattern 21c may be electrically connected.

Figure 6:
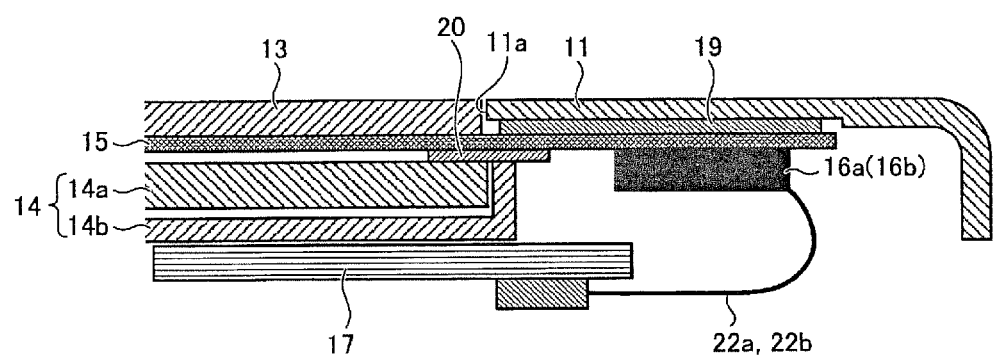
FIG. 6 is a diagram showing cases in which the vibration part comes in contact with the supply conducting wire and the grounding conductor that are disposed on the circuit board.
Figure 7:
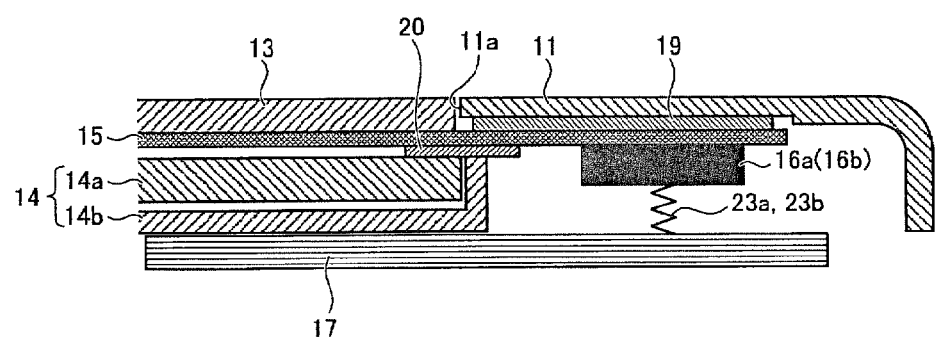
FIG. 7 is a diagram showing cases in which the vibration part comes in contact with the supply conducting wire and the grounding conductor that are disposed on the circuit board.

FIG. 6 and FIG. 7 are diagrams showing cases in which the vibration part is connected to the supply conducting wire and the grounding conductor disposed on the circuit board.

The vibration part 16 may be connected to the supply conducting wire and the grounding conductor that are disposed on the circuit board 17 with, for example, a wire-like supply conducting wire 22a and a grounding conductor 22b (FIG. 6). The vibration part 16 may be connected to the supply conducting wire and the grounding conductor that are disposed on the circuit board 17 with, for example, a spring-like supply conducting wire 23a and a grounding conductor 23b (FIG. 7).

In this case, for example, a magnetic sheet may be disposed between the touch panel 15 and the vibration part 16 in order to decrease the noise emitted from the vibration part 16 and the supply conducting wire 23a.

In the abovementioned embodiment, the first elastic member 19 is disposed between the second surface 11c of the flat plate part 11b and the touch panel 15. However, the present invention is not limited to this.

Figure 8:
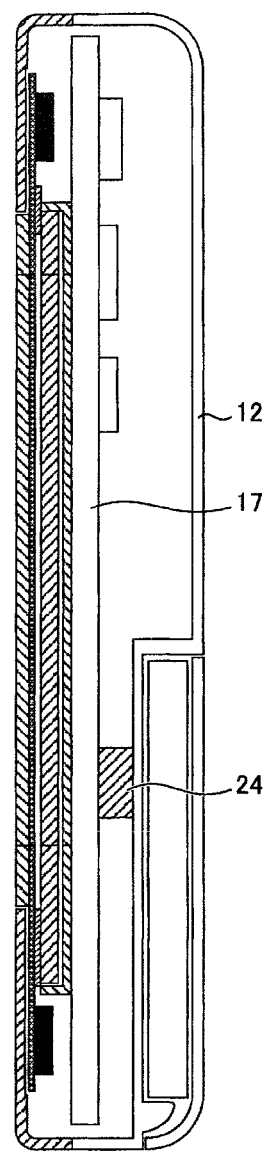
FIG. 8 is a diagram showing the mobile electronic device according to a different embodiment of the present invention.

FIG. 8 is a diagram showing a different embodiment of the present invention.

For example, in the abovementioned embodiment, in a case in which the circuit board 17 is not fixed to the rear case 12, as shown in FIG. 8, a third elastic member 24 may be disposed between the circuit board 17 (display rear surface section), which is disposed on the rear side of the display part 14, and the rear case 12 (housing rear surface section). In this case, it is preferable that the elastic modulus of the third elastic member 24 is smaller than the elastic modulus of the second elastic member 20.

The touch panel 15 may be a surface acoustic wave touch panel, a resistive touch panel, etc.

In the abovementioned embodiments, it was described that the first elastic member and the second elastic member are sponges; however, the embodiments are not limited to this. For example, the first elastic member or the second elastic member may be members having elasticity, such as spring or rubber.

As described above, some sections of the second elastic member 20 are exposed from the opening part 11a. However, the embodiment is not limited to this. For example, the entire section of the second elastic member 20 may be disposed so as to overlap with the flat plate part 11b, which is the surrounding section of the opening part 11a in the stacking direction. Therefore, the second elastic member 20 is no longer exposed to the outer section of the housing through the window 13; thus, the external appearance of the mobile phone 10 is not ruined.

The number or the position of the vibration parts 16 (the vibration member 16a and the vibration member 16b) is not limited to the abovementioned embodiments. For example, the vibration part may be disposed on the side surface of the touch panel.

While at least one exemplary embodiment is presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being comprised within the scope of the present disclosure as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile electronic device, comprising:
a housing that comprises an opening part; a display part that comprises a display area and that is disposed inside the housing, wherein the display area is visible from the outer section of the housing through the opening part;
a touch panel that is stacked and disposed on the outer side of the housing facing the display area of the display part, and that is exposed to the outer section of the housing;
a vibration part that vibrates, the vibration part disposed in the touch panel in the area that is on the outer circumferential side of the display part in the planar direction of the touch panel;
a first elastic member that is disposed between the touch panel and the housing, wherein the first elastic member is disposed at a position overlapping the surrounding section of the opening part for the housing in the stacking direction of the display part and the touch panel; and
a second elastic member that is disposed between the display part and the touch panel; wherein the display part comprises a non-display area that is adjacent to the display area, the non-display area overlaps with the surrounding section of the opening part of the housing in the stacking direction, and the second elastic member is disposed between the non-display area and the touch panel.

2. The mobile electronic device according to claim 1, wherein the vibration part, in the stacking direction of the display part and the touch panel, are disposed on the surface of the inner side of the housing of the touch panel.

3. The mobile electronic device according to claim 2, wherein the display part and the vibration part are disposed in the planar direction and side by side to each other in the inner section of the housing.

4. The mobile electronic device according to claim 2, wherein the thickness of the vibration part is thinner than the thickness of the display part in the stacking direction of the display part and the touch panel.

5. The mobile electronic device according to claim 1, wherein the vibration part is disposed at a position overlapping the surrounding section of the opening part in the stacking direction of the display part and the touch panel.

6. The mobile electronic device according to claim 1, wherein the first elastic member is a member having waterproof properties and/or dust resistance.

7. The mobile electronic device according to claim 1, further comprising:
the first elastic member that is disposed between the touch panel and the housing; and the second elastic member that is disposed between the display part and the touch panel, wherein an elastic modulus of the second elastic member is larger than an elastic modulus of the first elastic member.

8. The mobile electronic device according to claim 7, wherein:
the touch panel is a capacitance type touch panel.

9. The mobile electronic device according to claim 1, wherein:
the touch panel comprises: an operating area that faces the display area of the display part; a non-operating area that is adjacent to the operating area; a supply conducting wire that is disposed in the non-operating area, and that supplies the electric power to the vibration part; and a ground pattern that divides the operating area and the non-operating area.

10. The mobile electronic device according to claim 9, wherein:
the non-operating area of the touch panel overlaps with the surrounding section of the opening part of the housing in the stacking direction.

11. The mobile electronic device according to claim 1, further comprising
a circuit board that is disposed on the opposite side from the touch panel in the stacking direction with respect to the display part,
wherein the circuit board comprises a supply conducting wire that supplies electric power to the vibration part.

12. The mobile electronic device according to claim 11, further comprising a magnetic sheet that is disposed between the touch panel and the vibration part.

13. The mobile electronic device according to claim 1, wherein:
the touch panel is a capacitance type touch panel.

* * * * *